Aug. 29, 1961 L. A. M. PHELAN ET AL 2,997,941
APPARATUS FOR BROILING FOOD
Original Filed April 21, 1958 5 Sheets-Sheet 1

INVENTORS
LOUIS A. M. PHELAN
JOHN W. VOS
BY
Lieber, Lieber & Nilles
ATTORNEYS

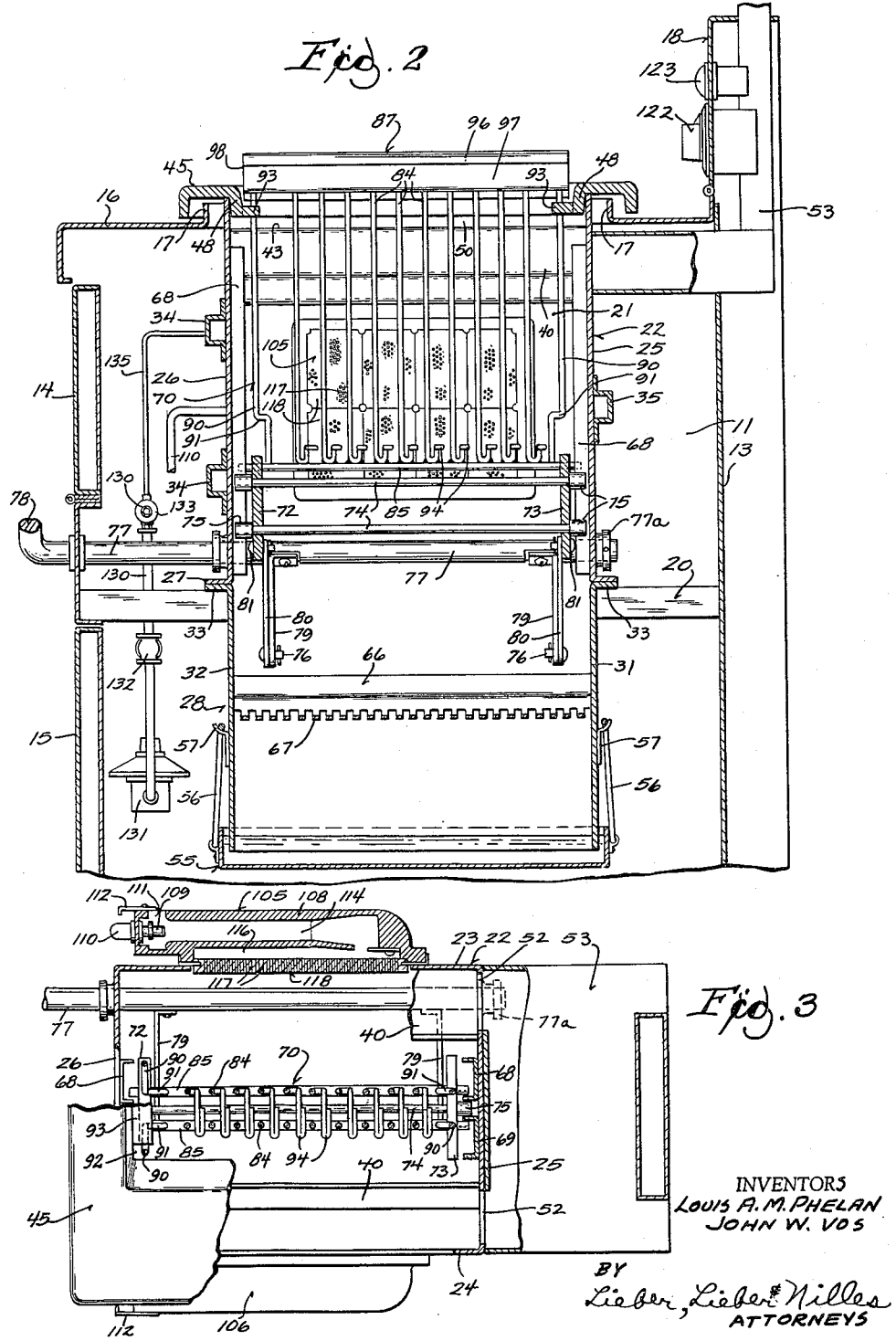

INVENTORS
LOUIS A. M. PHELAN
JOHN W. VOS
BY
Lieber, Lieber & Nilles
ATTORNEYS

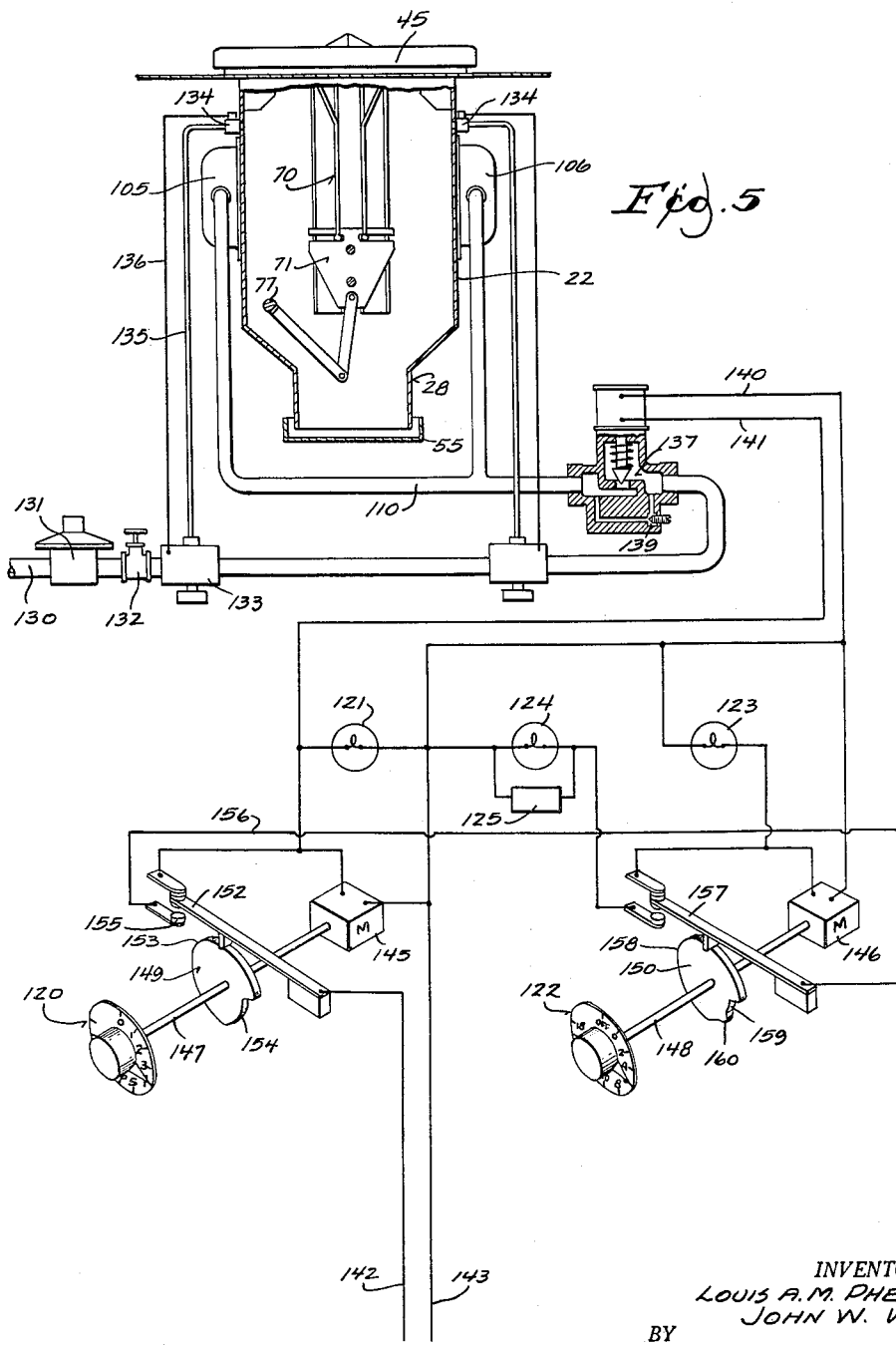

United States Patent Office 2,997,941
Patented Aug. 29, 1961

2,997,941
APPARATUS FOR BROILING FOOD
Louis A. M. Phelan, Roscoe, and John W. Vos, Rockton, Ill.; said Vos assignor to said Phelan
Original application Apr. 21, 1958, Ser. No. 729,788, now Patent No. 2,945,767, dated July 19, 1960. Divided and this application Nov. 23, 1959, Ser. No. 854,805
13 Claims. (Cl. 99—332)

The present invention relates to an apparatus for broiling food by subjecting it to intense radiant heat.

Processing food such as meat by broiling or grilling with high radiant heat is well known, and various means have been utilized in the past to produce such radiant heat. These prior art structures, however, have definite shortcomings as far as producing, controlling and transferring the heat with maximum efficiency. Many of these conventional devices have the combustion chambers separate from the broiling chamber which does not permit the most efficient utilization of the heat. Others have attempted to use radiant heating means which cannot produce the intensity of heat contemplated by this invention, nor can those heating means apply the heat or permit control of the broiling atmosphere as required in the present invention.

In accordance with the present invention, the food is subjected to intense radiant heat in a broiling atmosphere that is carefully controlled both as to air content and flow of products of combustion. As a result, this atmosphere is too low in oxygen content to support combustion of the food.

In one form of the invention enough oxygen may be supplied to burn off some of the fat vapors issuing from the meat being broiled at a location adjacent to the meat but out of contact therewith. Stated otherwise, because the flow of gases in the cooking chamber is carefully controlled, this excess oxygen is utilized before it reaches the meat and the latter is enveloped in an atmosphere that is too low in oxygen content to support combustion. These burning vapors produce heat in addition to that supplied by a primary source, and intensifies the total heat delivered to the meat. It also prevents the production of smoke and the accumulation of grease in the exhaust system.

The apparatus provided by one form of the invention produces a balanced condition of pressure in the broiling chamber, which pressure is slightly greater than atmospheric pressure. In addition, the air admitted to the broiling chamber is closely controlled as to quantity and direction of flow and preferably only through the fuel burners, and the flow of hot gases through and as they leave the chamber is also controlled. The effect of the exhaust system is such that the fuel and air introduced into the chamber and the pressure created thereby is not quite balanced by the exhaust effect and a slight pressure is maintained regardless of the heat setting because, for example, even though the amount of fuel mixture is reduced, then a lower heat is present in the chamber and the exhaust effect is also less.

Another aspect of the invention relates to the location of the opening for loading and unloading the meat into the chamber which opening is located at the top of the unit and which, because of the slight pressure maintained in the chamber, eliminates the need for completely sealing this opening while the broiling process is taking place. There is maintained within the broiling chamber, delicately balanced conditions of pressure and flow of hot gases, wherein oxygen is not permitted to contact the meat in sufficient quantity to support combustion of the food, and a portion of the fat vapors may be burned before passing to the exhaust system.

The result of the above construction and operation is the application of intense radiant heat to the meat in an atmosphere that is too low in oxygen content to support combustion of the meat, whereby the meat is quickly seared on the outer surface without any combustion thereof. Extremely high surface temperature of the meat is quickly obtained because the meat can absorb radiant type heat rapidly. This high surface temperature sears the surface and seals in the natural meat juices so rapidly the temperature of meat interior does not rise sufficiently to vaporize the liquids and cause dehydration. The heat absorbed by the meat is retained because the surrounding gases are of a higher temperature. The lack of oxygen prevents combustion of the meat and particularly the fats which would otherwise burn on the meat surface and produce a distasteful crust. By means of the present invention, a broiled product is provided which has a very tasteful and attractive brown crust on the surface and a savory juicy interior that is not overcooked.

Other more specific aspects of the invention contemplate apparatus for broiling the meat in two stages, (1) a first relatively short period of high heat which acts to sear and seal the meat surface, and (2) a second stage of lower heat during which the meat itself continues to conduct the heat inwardly toward its center until it is finished to the desired degree.

Another object of the present invention is to provide a raidant heat broiling apparatus of the above character which has means for easily disposing of the major portion of the fat that is melted from the meat, which means also acts to seal the bottom of the chamber to prevent the flow of air therethrough and thus contributes to accurate control of the atmosphere and higher temperatures in the broiling chamber.

Another object of the invention is to provide a manually settable control circuit for a radiant heat broiling apparatus which once set, automatically provides a broiling cycle of two separate stages of heat, operates a warning system at the end of the pre-set broiling period, and maintains a low heat in the broiler chamber to keep it hot for the next broiling cycle. The arrangement is foolproof to operate and an inexperienced operator can broil meat to any desired degree having an attractive browned seared surface, full moisture retention, minimum shrinkage, tenderness and delicious flavor.

The invention generally provides a radiant heat broiling apparatus which is highly efficient in operation, can be operated by inexperienced operators and is easily and completely disassembled for cleaning, repair and maintenance purposes.

These and other objects and advantages will appear hereinafter as this disclosure progresses, reference being had to the accompanying drawings in which:

FIGURE 2 is a side elevational view in section, of the apparatus shown in FIGURE 1 but on a reduced scale, the view being taken generally along line 2—2 in FIGURE 1, certain parts being broken away or removed for clarity;

FIGURE 3 is a plan view in section of the apparatus of FIGURE 2, certain parts broken away or removed for clarity;

FIGURE 5 is a schematic diagram of the combined gas supply and electrical circuit of the broiling apparatus shown in the above figures and which utilizes a two-stage system of applying heat;

FIGURE 6, in addition, shows a modified form of broiling chamber, exhaust means and food rack construction;

This application is a divisional application of our copending application, Serial No. 729,788, filed April 21, 1958, now Patent Number 2,945,767, issued July 19, 1960.

Figures 1, 9:
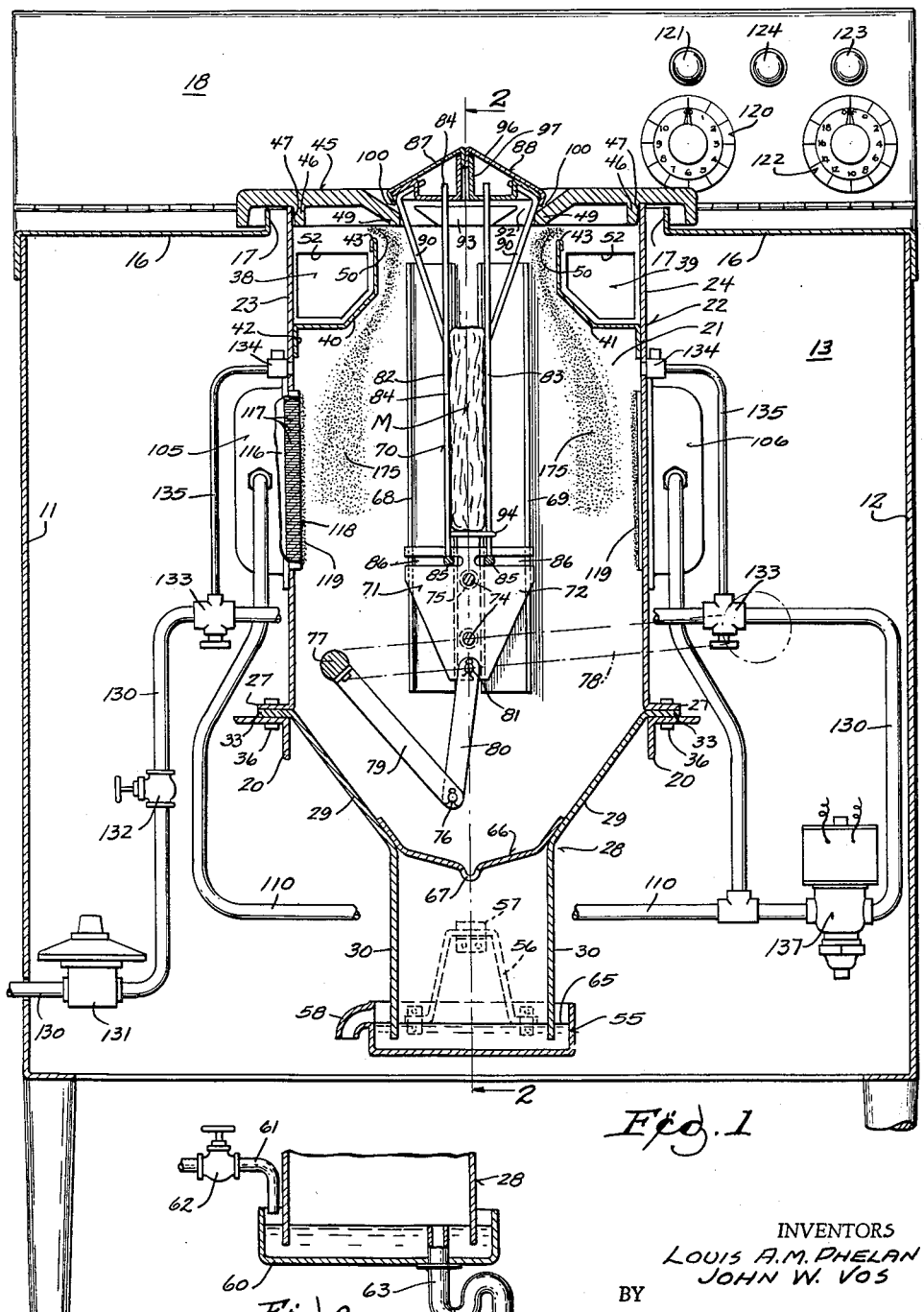
FIGURE 1 is a front elevational view in section of a broiling apparatus made in accordance with the present invention, certain parts being broken away or removed for clarity in the drawing.
FIGURE 9 is a fragmentary vertical sectional view showing a modified form of the disposal means for the liquid fat which also functions to seal the bottom of the chamber.

Referring in greater detail to the drawings, wherein a preferred embodiment of the invention has been shown for illustrative purposes, FIGURES 1 and 2 show the outer cabinet housing the apparatus, which cabinet generally comprises side walls 11 and 12, back walls 13, and front doors 14 and 15 which extend across the entire width of the cabinet and provide access to all valves and controls and other removable parts for service and maintenance. A top 16 has upwardly turned flanges 17 which define a large rectangular opening. An instrument panel 18 is hinged to the top and supports the timer controls and warning signals to be later described. Suitable support structure, including angle iron beams 20, are secured within the cabinet.

Broiling chamber

The broiling chamber 21 is defined by the upper box 22 fabricated from heat resistant sheet steel having side walls 23, 24, rear wall 25 and front wall 26, all of which have an outwardly extending flange 27 on their lower edges and extend at their upper edges slightly above the counter top 16. The bottom of the broiling chamber is defined, in part, by the bottom trough-like structure 28 having inclined sides 29 and terminate at their lower ends in vertical portions 30, and also having a back 31 and front 32 fabricated integrally therewith. The trough 28 has a flange 33 around its upper edge which rests on support 20. Horizontal stiffener channels 34 are spot welded to the outside of front wall 26 and a similar channel 35 is spot welded to the rear wall 25. These channels prevent the walls from warping due to the intense heat utilized and thereby insure accurate alignment and smooth operation of the relatively moving parts to be later described. The vertical guide tracks, to be described later, also act to rigidify the end wall in the other direction. The fabricated chamber thus formed is relatively light in weight, considering its strength and rigidity, and is economical to produce. The chamber is secured on the support structure 20 by bolts 36 which extend through the aligned flanges 27 and 33.

Exhaust means

Exhaust ducts or passageways 38, 39 are provided along the length of each upper side of the chamber and serve to draw off products of combustion, any smoke that may be formed and any fat vapors that are not burned during the broiling process, as will appear more fully later. These ducts also serve to keep the fat vapors hot until they are brought into contact with excess oxygen and thereby burned. The ducts are formed in part by sheet metal trough-like members 40, 41 which each have a flange 42 spot welded to the sides 23, 24 of the chamber, and these members terminate in top edges 43. The ducts are thus defined by the members 40, 41, the chamber side walls 23, 24 and also by the cover 45 which rests over the large opening in top 16. It will be noted that cast iron cover 45 has a pair of integrally formed parallel and downwardly extending flanges 46 which have tapered surfaces 47 that tightly seal against the upper edge of the chamber side walls.

The cover is removable simply by lifting it off the box 22, thus exposing the inside of the ducts and chamber for cleaning purposes. The cover itself can be then easily and thoroughly cleaned and when in position forms an effective seal with the chamber walls.

The cover has a central rectangular-shaped opening defined in part by downwardly extending flanges 48 (FIGURE 2) each having a tapered surface which seals against walls 25 and 26. The opening is also defined by the downwardly extending edges 49 (FIGURE 1) which extend farther inwardly than the ducts 38, 39, and thereby overhang the latter. In this manner, a long and narrow intake slot 50 is provided along the length of each of the ducts, which slots are carefully sized for purposes that will appear later. Thus an exit is provided along the full length of the chamber which the suction effect of the exhaust system to be distributed evenly along the chamber length.

These narrow exit slots also serve to mix the fat vapors and air before they leave the chamber so as to cause the vapors to burn, as will appear more fully hereinafter.

An outlet for each of these ducts is provided in the form of an opening 52 in the rear wall 25 which places the ducts in communication with the stack 53. These outlet openings may preferably be located as a series of holes in walls 23, 24 adjacent the ducts, and the exhaust material thus removed from the outer sides of the ducts rather than from the ends thereof. In any case, it is important that the size of the exhaust stack 53 is such to create only a draft which will maintain a pressure in the chamber that is slightly above atmospheric pressure.

Figure 6:
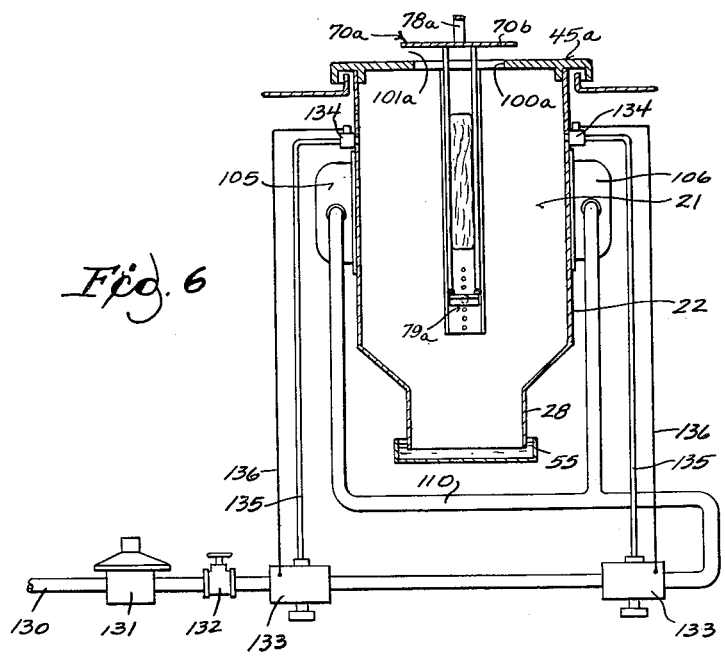
FIGURES 6 and 7 are schematic diagrams, respectively, of the gas supply and electrical circuit of the apparatus when using a one-stage system of heat application.

A modified form of broiling chamber, food handling rack and exhaust means is shown in FIGURE 6. In this embodiment the ducts 38, 39, opening 52 and stack 53 of the FIGURE 1 device have been eliminated and the opening 100a in the top cover 45a serves as the exhaust passageway. A vertically movable food handling rack 70a is positioned by a suitably insulated handle 78a in any one of a plurality of vertical positions and is held thereby suitable detent means 79a secured to the chamber wall and engaging the rack 70a.

The opening 101a provided between the top 70b of the rack and the cover 45a is variable depending on the vertical position of the rack in respect to the chamber, and this opening permits the escape of products of combustion which may be ultimately drawn off by an overhead hood or the like (not shown).

The size of opening 101a and its consequent exhaust effect is such, depending on the heat setting, so as to maintain the necessary slight pressure above that of atmospheric, in the chamber 21. The remainder of the FIGURE 6 device is generally the same as that shown in FIGURE 1 and the operation is also similar other than the above noted difference. The chamber 21 is preferably otherwise sealed against the entry of air and the only air admitted to this chamber is that supplied with the fuel.

Grease removal

Means are provided at the lowermost part of the broiling chamber to catch the liquid fat that issued from the meat during the broiling process, which means can be quickly removed for cleaning. In addition, this means forms an air seal for the bottom of the chamber which prevents the entry of any air therethrough. This means takes the form of a grease pan 55 which is held under the open end of the lower box 28 by hangers 56 which are pivotally mounted at the ends of the pan. Hangers 56 are hooked over the brackets 57 fastened to box 28, and the pan receives the melted fat which drips from the broiling chamber. An overflow elbow 58 may be provided to conduct excess fat into a container (not shown) and insure only a sufficient level of grease in the pan to effect an air seal for the bottom of the chamber.

An alternative form of a grease removal pan has been illustrated in FIGURE 9 wherein a level of water is maintained in the bottom of the box 60 by the supply line 61, regulating valve 62, and the overflow standpipe 63 having an air trap 64. In this embodiment, grease dripping into the water would float and pass out the overflow pipe along with whatever excess water was being supplied. The trap 64 prevents entrance of air into the chamber 21. The flowing water performs another important function also, namely, keeping the grease cool.

In either of the embodiments shown, the level of the liquid is sufficient to seal the open lower end of the chamber.

As indicated, it is necessary to keep the accumulated grease cool enough to prevent it from flashing into a flame when it comes into contact with the outside air along the outer edges 65 of the pan. The pan could be located at a considerable distance below the main chamber so as to remove it from the intense heat in the chamber. Such a location, however, would be impractical and would position the pan too close to the floor, particularly to drain the grease therefrom. Means are provided, therefore, for keeping this grease below its flash point temperature, which means comprises a baffle plate 66 that rests loosely on the inclined sides 29 and is coextensive in length with the chamber. The baffle has a lowermost trough portion 67 which contains a plurality of spaced apertures for draining grease therethrough. The baffle substantially separates the grease pan from the direct heat in the broiling chamber and prevents overheating, volatilizing and smoking, or danger of firing of the grease when the latter is exposed to air. The baffle is removable for cleaning or inspection from either the bottom or top of the chamber.

Food loading and unloading means

The food is loaded into the chamber 21 and removed therefrom preferably through an opening in the cover 45, which opening is substantially closed during the broiling process in order that pressure within the chamber can be controlled. Because of the balanced conditions in the chamber due, inter alia, to the controlled flow of exhaust and a slight pressure in the chamber, there is no appreciable tendency either for outside air to enter the chamber during operation, or for the hot gases within the chamber to leave via these small openings in the cover. If any flow does occur through these openings, it would be outwardly of the chamber.

By so locating the loading opening at the top of the chamber, the entrance of outside air is minimized even when the top is completely open. Furthermore, the food rack (to now be described) is such that the degree to which the loading opening is closed will vary somewhat depending on the thickness of food product to be broiled. However, with the present design a considerable variation in the size of the top opening can be tolerated without detracting from the over-all efficiency of the apparatus.

Rack retaining means in the form of a pair of parallel and spaced channel irons 68, 69 are welded or otherwise secured to both the rear wall 25 and front wall 26 and provide an outward limit to which the lower ends of the food rack assembly 70 may travel. As previously mentioned, these channel irons also serve to stiffen the end walls and prevent warping thereof. The space between the channel irons 68 and 69 defines a track in which the carriage to be described is guided in its vertical movement. A carriage 71 comprises end plates 72, 73 which are rigidly secured together by carriage rods 74 extending therethrough. Bearings 75 are mounted on the protruding ends of the rods and are guided between channels 68, 69. These bearings are made of cylindrical pieces of hard bronze which form a slip fit with the rod ends. These bearings are prevented from coming off the rods due to the lack of clearance between the rod ends and the walls 25, 26. One reason for stiffening channels 34, 35, therefore, is to prevent warping of the walls and insure proper operation of the carriage.

Figure 4:
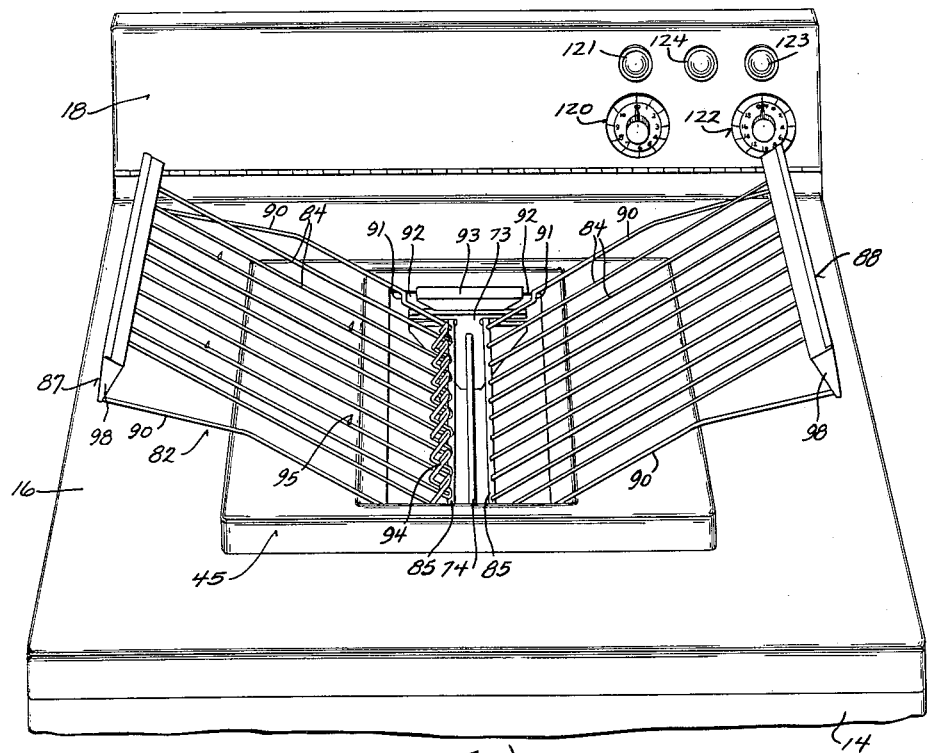
FIGURE 4 is a fragmentary perspective view of the top of the apparatus and showing the food basket in the fully open position.

The carriage operating shaft 77 is rotatably mounted in the box 22 and extends forwardly from the cabinet and terminates in a control handle 78. A link 79 is bolted to the shaft 77 adjacent both the front and rear of the chamber and are each pivotally connected at their free end by the pin and cotter key assembly 76 to one end of corresponding link 80. The other end of links 80 are pivotally attached to their respective carriage plates 72, 73 by a bronze pin and cotter key assembly 81. As the control lever is swung counterclockwise from the line position shown in FIGURE 1, the carriage is raised from the broiling position shown in that figure to the open position of FIGURE 4.

The rack assembly 70 also includes complementary racks 82 and 83 which are formed by a plurality of spaced vertical rods 84 welded to the lower cross bars 85. The ends of the cross bars 85 are slidable in the oppositely extending slots 86 of the carriage plates 72, 73 and these bars also extend into their corresponding channels 68, 69. The upper ends of the vertical rods 84 are secured in their corresponding top 87, 88. A rack guide bar 90 is provided at each end of the rack and are welded at their lower ends to their cross bars 85. These guide bars 90 are bent as at 91 (FIGURE 2) to offset the lower ends thereof. The bars 90 are inclined at their upper portions (FIGURE 1) and are secured at their upper ends to their respective tops 87, 88. These guide bars 90 are slidable in the guide slots 92 formed between the edges 49 of the cover and the guide lugs 93 (FIGURES 1 and 2) formed integrally on the cover flange 46. Thus the vertical movement of the racks 82, 83 is positively controlled and they are forcibly opened to the position shown in FIGURE 4. The racks cannot tip haphazardly or fall in the wrong direction. That is to say, as the control handle 78 is swung to the "open" position, the racks are raised and simultaneously guided to the open position. In the event the food adheres to the racks, it is forcibly pulled from one of the racks.

One of the racks has extensions 94 which pass between the opposite rack bars 84 and hold the food between the racks to prevent it from slipping downwardly therebetween. Sharp projections 95 on the left hand rack also serve to hold pieces of meat in place between the racks.

The rack tops 87, 88 are fabricated from two formed pieces of sheet metal 96, 97, preferably of stainless steel. These pieces are generally coextensive in length and spot welded together. The bars 84 and 90 are inserted in apertures in piece 97 and secured therein. The inner piece 97 serves to reinforce the top structure and also serves to add a finished appearance to the top. The triangular shaped ends 98 (FIGURES 2, 4 and 8) are formed by bending a portion of the top piece downwardly to also present a clean design. It will also be noted from FIGURE 2 that these ends of the tops lie closely adjacent the cover opening flanges 48.

The tops 87, 88 are adapted to bear against one another along their uppermost edges when the broiler is closed (FIGURE 1).

The operation of the food racks is as follows. As shown in the open position in FIGURE 4, the racks are inclined at about 35 degrees from the horizontal, which position permits easy loading and unloading of the food. The food may be placed against the extensions 94 on the left-hand rack or if smaller pieces of food are to be broiled, they may be placed one above the other, but not in contact with each other and held in position by the sharp prongs 95. The handle 78 would then be swung in the clockwise direction (FIGURES 1 and 4) thereby lowering the rack assembly into chamber 21, the meat being clamped between the racks. As the assembly is lowered, the rack guide bars 90 slide between the guide lugs 93 and cover flanges 49, and thus control the angle between the racks for any height of the assembly. During the downward movement the bearings 75 of the carriage are guided between the channels 68 and 69.

The arrangement and construction of the rack assembly, its guide channels 68, 69 and its guide slots 92 are such that the rack automatically adjusts itself to any thickness of food, for example, from one-half to two and one-half inches.

In the lowermost position, the inclined portion of the guide bars 90 rests on the cover flanges 49 and the uppermost edges of the tops 87, 88 bear against one another. In other words, the assembly hangs in the opening and its weight holds the racks tightly against the food.

Any thickness of food can be accommodated up to the limits defined by the outer flanges of the guide channels 68, 69. The arrangement shown in FIGURE 1 contains a relatively thin piece of meat M wherein the cross bars 85 lie closely adjacent the inner flanges of channels 68, 69. It will be noted a relatively narrow opening 100 then exists between the tops 87, 88 and the cover. If a thicker piece of meat is used, the racks would be farther apart, particularly at their lower ends, and the assembly would rest slightly higher in the chamber, thus openings 100 would be correspondingly larger. Nevertheless, the tops 87, 88 still bear against one another, except where an exceptionally thick and large piece is broiled.

Because the loading opening is located in the top of the unit, and the entrance of air into the chamber is otherwise closely controlled, the slight pressure maintained in the chamber during the broiling process permits openings 100 to be variable to a certain extent without sacrificing control of air entry therethrough. Stated otherwise, by loading the broiler from the top, rather than through a side or bottom, the opening need not be completely sealed. Even when the opening is fully open, entrance of outside air is minimized because it is located at the top of the unit.

To raise the rack assembly after processing the food, the handle 78 is swung in the counterclockwise direction (FIGURE 1) and as the assembly rises, the guide bars 90 slide upwardly in slots 92. Thus the minimum angle between the racks is insured even though a thick piece of food is in the rack and the cross bars 85 are spread to their outermost position. The minimum angle required between the racks is an angle which will positively separate the racks in the event the meat adheres to both racks after broiling. This minimum angle must be large enough to cause the racks to tip back from the vertical center line of the unit so as to prevent their falling in the wrong direction.

The action of the rack assembly is such that whenever the assembly is raised the cross bars 85 will slide toward the innermost ends of the slots 86. Thereby the racks are centered and ready to receive a thin piece of food or will automatically open upon lowering of the assembly so as to accommodate a thicker piece of food. The channels normally hold the cross bars 85 captive in their slot 86.

Figure 8:
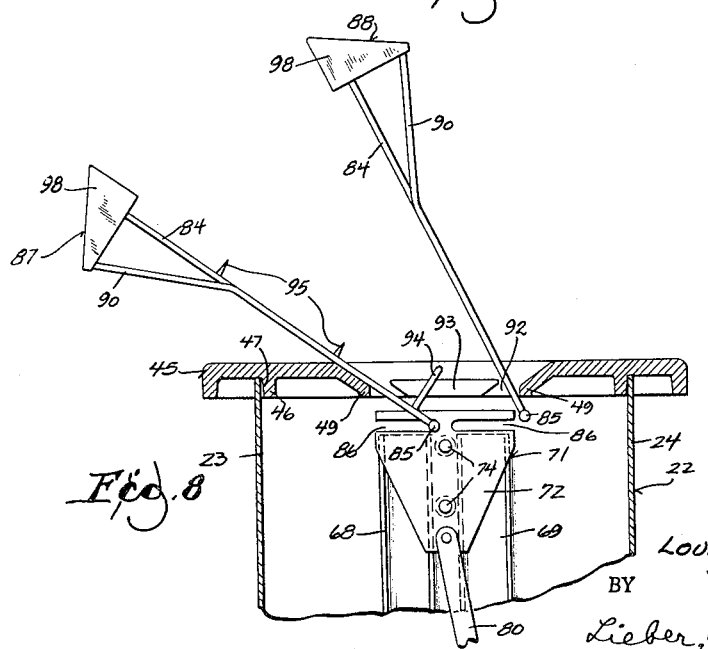
FIGURE 8 is a fragmentary vertical view, in section, showing one of the food racks in the fully raised position and the other rack being tilted for removal.

The construction and arrangement of the rack assembly and associated parts permit easy and quick assembly or disassembly of all of the parts for cleaning, maintenance or repair, as follows:

When in the fully open position (FIGURES 4 and 8), the racks may easily be removed by swinging them toward the center of the broiler, as shown by right side rack in FIGURE 8. This causes the cross bar 85 to leave its slot 86, and the rack can then be removed. Bars 85 can leave their respective slots because the channels 68, 69 do not extend upwardly far enough to hold the bars captive in their slots when in the uppermost position, nor need the channels extend this high because of the fact that bars 85 are normally urged to the inner end of their slot 86 when the assembly is raised. Removal of the guide bars 90 from their guide slots 92 is also permitted when the assembly is raised because of the inwardly offset (FIGURES 2 and 4) lower portion of these bars. In other words, the lower portion of the guide bars 90 are spaced inwardly beyond the guide lugs 93 to permit removal of the racks.

After removal of the racks, the cover can be simply lifted from the top of the box 22 which then permits ready access to the interior of the chamber.

The carriage may then be removed by withdrawing the cotter key and pin assembly 81 which connects links 80 to the carriage.

The linkage 79, 80 can be removed by unscrewing the cap bolts which secure it to the operating shaft 77. Shaft 77 is then withdrawn through the front of the cabinet after its rear collar 77a (FIGURE 2) has been removed.

*Radiant heating means*

The apparatus of the present invention involves the use of exceptionally intense radiant heat which quickly develops a high surface temperature on the food and, in the case of meat, quickly sears the surface thereof. As a result, the meat juices are sealed in the meat without raising the temperature of the meat interior to a point at which liquids would vaporize and cause dehydration. A high surface temperature of the meat is obtained because the meat can absorb this radiant type heat more quickly than heat transmitted by convection or conduction. Furthermore, and importantly, the meat is surrounded by gases which are hotter than the meat itself and therefore the meat does not dissipate heat which it has absorbed. A particularly efficient means is thus provided for transferring heat to the meat and causing the latter to absorb this heat. The temperatures and intensity of the heat source used with the present invention, particularly when the heat source used is located directly in the broiling chamber, requires that the atmosphere in which the meat is broiled must be carefully controlled as to the content of oxygen. Otherwise the meat and particularly the fats would burn on the meat surface.

A preferred form of the invention provides for applying this intense heat simultaneously to both sides of the meat to prevent the escape of juices from the side not being cooked, and to insure even and equal broiling and more accurate control of the degree of finish.

A particularly efficient means will be now described for furnishing the intense radiant type heat required for this process. This means comprises high-intensity radiation gas burners 105 and 106 which are mounted in the vertical walls 23, 24, respectively of the box 22. These burners are installed in opposing relationship to one another and spaced a distance apart so as to receive the rack assembly 70 therebetween.

Burners 105, 106 are of the low-pressure, low-resistance, and fully aerated type, which, due to their construction, will not light back even at the intense heat developed. These burners each comprise a cast housing 108 (FIGURE 3) having a gas inlet orifice 109 which is in communication with supply conduit 110. The amount of air mixed with the gas is determined by the adjustable shutter 112 which regulates the size of the inlet opening in the air box 111 and thus the amount of air permitted to enter the box. The gas and air pass through the venturi section 114 which creates the necessary turbulence that drives the mixture through the chamber 116 under the tiny holes 117 in the ceramic mat 118.

The ceramic mat 118 is perforated by a number of small closely spaced holes, for example, approximately 200 holes per square inch. This mat is a very good insulator and its thermal conductivity is so low that the inside surface is never raised to the ignition temperature of the fuel, unless the burner is grossly overloaded.

The burner is therefore very stable and will not light back to ignite the fuel in chamber 116, and thereby use of low pressure fuel supply and atmospheric air supply, without any air blast is possible.

The tendency of the surface to thus heat up is made use of and an incandescent radiator is obtained in this manner. The entire surface of the burner becomes red hot and not merely small areas or points thereof, and radiation from this large surface quickly heats the food.

The fuel mixture burns adjacent the surface of the burner as indicated in FIGURE 1 by the shaded area 119, in a layer of flame and the ceramic mat reaches a maximum temperature of about 1700 degrees Fahrenheit.

Preferably, enough air is supplied with the fuel to cause complete combustion of the latter. In other words, and importantly, these infrared generators are 100 percent primary air burners and require no secondary source of air to completely support combustion of all the fuel passing therethrough.

The infrared rays produced by these generators 105, 106 heat the objects they contact but not the space between the infrared source and these objects, similar in this respect to the infrared rays produced by the sun.

The intense infrared heat energy used in this process and apparatus is within a range of wavelengths which correspond to a high absorption coefficient of the meat.

The temperature of the radiant mats at their surfaces is variable of course and depends on many factors such as the amount of heating surface, type of fuel used and amount of fuel delivered to the burners and burned. The distance of these radiants from the meat will also affect the determination of the temperature to be used for these radiants.

The total amount of heat that is desired to be delivered to the meat also varies with many factors such as the thickness of the meat and degree of finish desired.

Naturally, if a higher intensity of heat is delivered to the meat, less time will be required to finish it than if less intense heat were applied.

The burners above described have proven to be exceptionally advantageous and desirable when used for this broiling process in a controlled atmosphere too low in oxygen content to support combustion of the meat. The apparatus described above provides for a distance between the opposed broiling surfaces of about 9½ inches, which arrangement has proven to be quite practical, but, of course, this distance could be variable as desired or necessary for other installations.

A very satisfactory temperature range of burner surfaces, with the above arrangement, has been generally from 1100 to 1700 degrees Fahrenheit. The temperature to be used depends on many factors as previously mentioned, and reference will now be made to a two-stage and also to a one-stage broiling process, by way of examples of practicing the present invention.

In the two-stage process, the apparatus shown in FIGURES 1 and 5, in particular, would be used. A two-stage operation is desirable in order to quickly sear and thereby seal the surface of the meat with an intense heat over a relatively short period of time. Practice has shown that a relatively short period of time for the first heat stage and a longer period of time for a second or finishing heat stage has proven satisfactory for good surface searing and moisture retention of the meat. The meat itself conducts the heat inwardly to its interior to effect the desired degree of cooking, which degree is determined, inter alia, by the duration of the cooking time and the total amount of heat delivered to the meat. During the finishing period, the juices, which carry most of the meat flavor, are prevented from escaping due to the sealed meat surfaces and the application of heat simultaneously to both sides of the meat.

The food may be broiled with only one stage of heat and usually this heat will be less than the maximum temperature contemplated for the first stage of the two-stage process. That is to say, with the above arrangement, if a burner temperature of about 1650 degrees Fahrenheit were applied for much longer than 4 minutes, the surface of most foods would be damaged. This single stage heat temperature should be high enough for proper and quick searing of certain foods such as steaks, and yet low enough to be able to broil the food over a sufficient period to finish the food to the desired degree.

*Control system*

*Two-stage control.*—The gas supply circuit and the electrical circuit for controlling the two-stage heating apparatus is shown best in FIGURES 1 and 5 and the operation thereof is generally as follows. At the time the meat is lowered into the chamber, the machine is on "high fire" (as shown in FIGURE 5), and it remains on this high heat for a period as determined by a manually settable pointer of timer 120. During this high-heat period, a "high fire" indicator light 121 is on which gives a visible signal to the operator. At the end of the first stage of heat, the gas supply is reduced and a lower stage of heat is supplied for a period as predetermined by the manually settable pointer of timer 122. During this second stage, a "low fire" indicator light 123 is on and the high fire light is off. Then at the end of the second period of time, the low heat remains on in order that the broiler remains hot for the next broiling cycle. However, the low heat light 123 goes out and the "ready" light 124 and the buzzer 125 both turn on, thus giving the operator ample warning to remove the food. The only settings required by the operator are the periods of time for each stage of heat.

The gas supply system is so arranged that each valve, pilot burner or orifice may be easily removed for maintenance or replacement.

The gas supply line 130 may be connected to a source of any one of different types of fuel, such as manufactured or natural gas or a combination thereof, or other vaporized fuels. For the sake of convenience, reference is made throughout this specification to gas as being the fuel, but other forms of fuel, of course, are contemplated for use with this invention.

The fuel is passed through a conventional pressure regulator 131 and then through a hand valve 132 which is manually settable to determine the temperature of the heat stages. The gas then passes through the conventional automatic safety pilot valves 133 of the spring-loaded magnetic type, which valves will close if its thermo-couple type pilot burner 134, connected by conduit 135 and thermo-couple lead 136, is not of a sufficient temperature.

The fuel passes through a conventional solenoid operated valve 137, which, in this particular installation, is normally closed so that when it is energized it is open and gas flows therethrough to conduits 110 to create a "high" fire or high heat stage. When de-energized, the valve is closed and the flow is through an adjustable by-pass valve such as a needle valve 139. The reduced flow of gas through the by-pass valve provided the lower heat stage.

The solenoid valve 137 is connected by wires 140, 141 to the electrical circuit, the latter of which is connected to a power source by lead lines 142, 143. The motors 145, 146 are connected to their respective shafts 147, 148 through slip clutches (not shown) so the manually settable pointers secured to their respective shafts can be set manually to start the broiling cycle. Cams 149, 150 are carried by shafts 147, 148, respectively, and the relationship between each of the timer pointers and their cams is fixed, as follows.

The position of the timers and circuit switches is shown in FIGURE 5 for "high fire," the pointer of timer 120 being set for about 4 minutes, during which period the switch pole 152 is held by the circumferential surface 153 of the cam so the solenoid of valve 137 is energized and full flow of gas therethrough is provided for high heat. When the cam rotates sufficiently to present the cam surface 154 to the switch pole 152, the latter breaks the contact to the solenoid and de-energizes it, causing the spring-loaded solenoid valve to close and thereby reducing the gas flow to that quantity determined by the needle valve 139. The high fire light 121 then also goes out. At the same time, pole 152 makes contact with terminal 155 and closes the circuit to the low fire light 123 and motor 146 through wire 156 and switch pole 157. Pole 157 holds the motor 146 in the circuit by means of the circumferential portion 158 of cam 150 which was set by the operator at the same time that cam 149 was positioned. The cam 150 then rotates until it presents cam surface 159 to the pole 157 at which time the pointer is at "O," the motor 146 is stopped, low fire light 123 goes out, and the ready light 124 and associated buzzer 125 are thrown into the circuit. The operator has sufficient warning, both visually and by sound, and the food is then removed from the broiler, but the low heat remains on to keep the unit hot for the next cycle of broiling. To turn the buzzer and ready light off, the operator must manually move the pointer of timer 122 from "O" to "off." This movement places cam portion 160 against switch pole 157 which is then in "neutral" and does not contact either of its terminals. As a result, the entire circuit is then disconnected.

Figure 7:
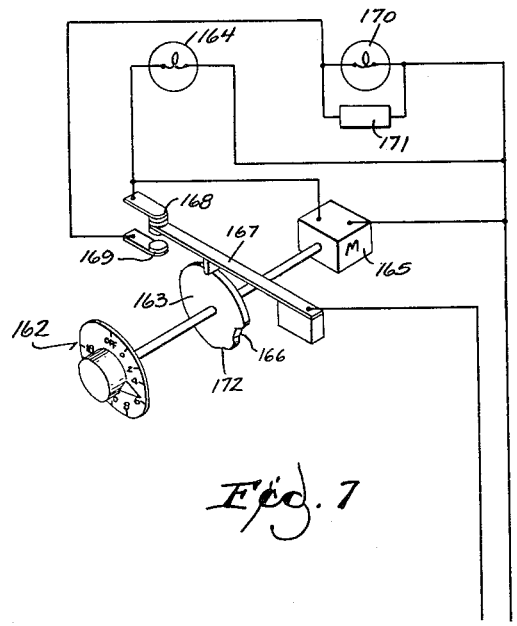

*One-stage control.*—FIGURES 6 and 7 illustrate the one-stage control system. This apparatus is generally the same as the two-stage system except the solenoid valve 137 and its needle valve 139 are not used. Furthermore, the electrical circuit, as shown in FIGURE 7, is not connected with the gas supply means and only one timer 162 is required for warning.

When cam 163 rotates from the heating position shown, in which the cooking light 164 and motor 165 are on, to the position in which cam surface 166 is presented to the switch pole 167, the latter then throws the light 164 and motor 165 out of the circuit by disengaging the terminal 168. At the same time, terminal 169 is engaged and the ready light 170 and buzzer 171 are thereby thrown into the circuit. The pointer is then at "zero" and the pointer must be manually moved "off" to present cam surface 172 to pole 167 in order to turn off the warning signals.

*Résumé*

Referring to FIGURE 1, the gas is introduced into the broiling chamber along with sufficient air preferably to completely support combustion of all the gas. If insufficient air is introduced to burn all the gas, the latter is simply drawn out through the exhaust ducts. For the most efficient and clean operation, however, it is desirable for all the gas to be burned before leaving the broiling chamber. In fact, it is highly desirable to supply air, more particularly oxygen, in an amount slightly in excess of that required to completely burn all the gas supplied. This excess air is supplied along with the fuel and good control of the quantity and direction of flow of the gases is thereby assured to prevent combustion on the meat surface. By supplying a slight excess of air, and controlling its flow in the chamber, a portion of the vaporized fat that issues from the meat soon after the meat is introduced into the chamber, is burned generally in the dot-shaded area 175. Because of the low pressure and no-blast action of the burner, the fat vapors have an opportunity to travel a distance outwardly from the meat before coming in contact with the excess oxygen issuing from the burners. This vapor burning therefore takes place at the surface of the burners and a short distance therefrom, but insufficient oxygen reaches the meat to support combustion thereof. In other words, the meat is broiled by radiant rays in an atmosphere that is too low in oxygen content to support combustion of the meat. A haze of burning fat vapors develops at each side of the meat at a distance therefrom, as indicated by the shaded area 175 in FIGURE 1. These burning fat vapors act to add to the heat supplied to the meat by the burning fuel at the burners. Thus, with the proper amount of air, very little smoke is produced. There is preferably no air entering the chamber other than through the burners and therefore no convection or rapid flow of air or gases occurs in the chamber.

Duct portions 40, 41 are connected to the inside entrance of the stacks and receive direct radiation. They therefore serve an important function in keeping the fat vapors hot until they are brought into contact with the excess oxygen and thereby burned. The narrow slot 50 which forms the exhaust outlet from the chamber helps to mix the vapors with any excess oxygen. More particularly, the side of the burning area 175 which is adjacent the meat is rich in fat vapor content while the side of that area adjacent the burners has more oxygen. As these vapors approach the narrow slot, the oxygen and vapors are brought more intimately in contact with one another and burning of the vapors is thereby enhanced.

Burning of the fat vapors prevents the production of smoke, which would otherwise develop upon cooling of the unburned vapors after they passed from the exhaust stacks, and also prevents the vapors from condensing as grease in the exhaust system to thereby create a fire hazard.

The size of the outlets 50, ducts and stacks are such to provide a proper draft that results in a pressure within the chamber slightly greater than atmospheric pressure. As a result, the tendency for air to enter the openings 100 in the top is minimized, as is any tendency for the hot gases to pass outwardly through these small openings. Any smoke or hot gases pass in a slow and smooth flow pattern through inlet slots 50 and out the exhaust.

In one of the preferred embodiments shown, the loading opening in the cover is almost completely closed during broiling so the pressure and flow of gases in the chamber can be controlled. By loading through the top of the machine and otherwise substantially restricting air from flowing freely through the chamber, entry of air into the chamber is minimized even when the top is completely open.

With the present apparatus, practically no liquid meat juice is lost during the broiling as the initial intense heat seals it within the meat and actually drives the juices to the center of the meat when both sides are heated simultaneously. Fat issues from the meat in the form of liquid or vapors, but inspection and analysis of the grease pan contents have shown practically no meat juice content therein, the contents being largely liquid fat.

After the meat has been removed from the heat for a period of about one minute, its high juice content is apparent because the meat surface actually appears moist due to the juices that slowly seep through to the outside surfaces of the meat. The meat produced by this apparatus has a tasteful and attractive brown crust on the surface, extremely good moisture retention and flavor, savory juicy interior that is not overcooked and that cannot be equalled by conventional methods.

Various modes of carrying out the invention are contemplated as being within the scope of the following claims particularly pointing out and distinctly claiming the subject matter which is regarded as the invention.

What is claimed and desired to be secured by Letters Patent is:

1. Apparatus for broiling meat comprising, an enclosed broiling chamber having a top opening for receiving food therethrough, means directly in said chamber at opposite sides thereof for supplying intense radiant heat directly to meat therein, and means adjacent the top of said chamber and forming an exhaust passage for hot gases in said chamber, said means being so sized that a pressure slightly greater than atmospheric pressure is maintained in said chamber during the broiling process, said pressure acting to prevent entry of air through said top opening into said chamber.

2. Apparatus for broiling food comprising, an enclosed broiling chamber having an opening in the top for the passage of food therethrough, means for reducing the size of said opening and thereby substantially sealing said chamber against entry of air, said chamber being so constructed as to control the amount and flow path of air flowing therethrough, a low pressure and fully aerated fuel burner directed into said chamber and at each side thereof for supplying intense radiant heat directly to food in said chamber, said burners including a generally vertically positioned ceramic mat having a plurality of holes for the passage of a fuel mixture, an exhaust passageway located adjacent the top of said chamber for removing products of combustion from said chamber, said passageway being so sized that a pressure slightly greater than atmospheric pressure is maintained in said chamber during the broiling process, said pressure acting to prevent the entry of air through aid opening and the flow of products of combustion in and from said chamber is controlled.

3. Apparatus for broiling food comprising, an enclosed broiling chamber having an opening in the top for the passage of food therethrough, means for reducing the size of said opening and thereby substantially sealing said chamber against entry of air, a low pressure and fully aerated fuel burner directed into said chamber and at each side thereof for supplying intense radiant heat to food in said chamber, said burners including a generally vertically positioned ceramic mat having a plurality of holes for the passage of air and fuel, and an exhaust duct in the top of said chamber at either side thereof and directly subjected to said heat, said ducts having a narrow passageway extending along the length of said chamber for removing products of combustion therefrom, said exhaust duct and passageway being so sized that a pressure slightly greater than atmospheric pressure is maintained in said chamber during the broiling process, whereby the entry of air through said opening is prevented and the flow of products of combustion in and from said chamber is controlled.

4. Apparatus for broiling meat comprising, a broiling chamber having a top side, closable opening in said top side for the passage of meat therethrough; a generally vertically positioned, low pressure and fully aerated fuel burner on each of two opposite sides of said chamber and extending directly into said chamber for supplying intense radiant heat simultaneously to opposite sides of said meat, a meat handling rack insertable through said opening and to a position between said heat supplying means, said chamber having an exhaust outlet adjacent its upper end, a sheet metal trough-like member adjacent the top of said chamber and at each side thereof and directly subjected to said heat, said members acting to deflect hot gases from said chamber and out said exhaust outlet, and adjusting means for setting said burners on a high and a low heat delivering setting to thereby broil said meat in two different stages of heat.

5. A device as defined in claim 1, further characterized in that said means for supplying radiant heat comprises a low pressure and fully aerated fuel burner directed into said chamber and at opposite sides thereof for supplying intense radiant heat to food in said chamber, and said burner including a ceramic mat having a plurality of holes for the passage of a fuel mixture.

6. The combination set forth in claim 5, further characterized in that said mats have an adjustable range of temperatures generally from 1100 to 1700 degrees Fahrenheit.

7. The apparatus set forth in claim 1, further characterized in that said means forming said exhaust passage comprises an exhaust duct in the top of said chamber for each side thereof and directly subjected to said heat, said ducts having a passage for removing hot gases from said chamber.

8. The apparatus set forth in claim 1, including a removable top cover forming a sealing fit with said chamber and in which said top opening is located, and said means forming an exhaust passage comprising an exhaust trough adjacent the top of said chamber and at each side thereof, said troughs and said cover defining a narrow and elongated outlet for exhaust from said chamber, said troughs being subjected to direct heat from said chamber and said chamber and troughs being exposed for said cleaning when said cover is removed.

9. The apparatus as defined in claim 1, further characterized in that said chamber has an open lower end and said apparatus includes a drip pan detachably connected to and abutting against said open lower end, said pan being adapted to contain a liquid of sufficient level to seal said lower end against the entry of air.

10. The combination set forth in claim 9, including a baffle plate in said chamber and above said pan for preventing excessive heat in said chamber from reaching said pan to thereby keep any grease in said pan from reaching its flash point.

11. The arrangement as set forth in claim 9, including a means for maintaining a level in said pan of constantly flowing coolant for preventing excessive heat in said chamber from causing grease in said pan to reach its flash point.

12. The apparatus as set forth in claim 2, including a fuel supply conduit for said burners, an electrically shiftable valve mechanism in said conduit and shiftable between open and by-pass positions for permitting fuel to be supplied to said burner at a high rate and at a low rate, respectively; an electrical circuit connected to said mechanism for shifting the latter and including a manually settable high-heat timer which when in said circuit causes said mechanism to be in the open position, said high-heat timer when out of said circuit permitting said mechanism to shift to the by-pass position, a low-heat manually settable timer which is thrown into said circuit by said high-heat timer when the latter goes out of said circuit, said low-heat timer causing activation of a signal device at the end of a predetermined time.

13. The apparatus as defined in claim 2, including a fuel supply conduit for said burners, an electrically shiftable valve mechanism in said conduit and shiftable between open and by-pass positions for respectively permitting fuel to be supplied to said burner at a high rate and at a low rate; an electrical circuit connected to said mechanism for shifting the latter, said circuit including a manually settable high-heat timer having a rotatable cam-operated switch shiftable between two positions, said switch when in one position causes said mechanism to be in the open position, said switch when in said other position permitting said mechanism to shift to the by-pass position, a low-heat manually settable timer which is thrown into said circuit when said switch is in said other position, said low-heat timer having a rotatable cam-operated switch that has three positions which permit, respectively, operation of said mechanism by said high-heat timer, activation of a signal device at the end of a predetermined time, and a neutral position which is selected manually.

References Cited in the file of this patent

UNITED STATES PATENTS

| | | |
|---|---|---|
| 1,192,306 | Heiser | July 25, 1916 |
| 2,031,330 | Padelford et al. | Feb. 18, 1936 |
| 2,217,226 | Lux | Oct. 8, 1940 |
| 2,605,969 | Sanders | Aug. 5, 1952 |
| 2,821,127 | Hess | Jan. 28, 1958 |
| 2,885,151 | Weber | May 5, 1959 |
| 2,931,352 | Edwards | Apr. 5, 1960 |
| 2,947,240 | Bloxsom | Aug. 2, 1960 |

OTHER REFERENCES

Research Bulletin 73, November 1956, Amer. Gas Assoc. halo., 1032 E. 62nd St., Cleveland 3, Ohio, "Heat Application to Gas-Fired, Portable Deck Bake Ovens."